INVENTORS
FERD R. ANDERHOLM
DONALD J. FARRIS
LESTER J. FIEGEL, JR.
BY Donald F. Voss
ATTORNEY

| FIG. 2a | FIG. 2b | FIG. 2c |

3,374,461
PHYSIOLOGICAL MONITORING SYSTEM
Ferd R. Anderholm, Donald J. Farris, and Lester J. Fiegel, Jr., Rochester, Minn., assignors to International Business Machines Corporation, New York, N.Y., a corporation of New York
Filed Feb. 25, 1964, Ser. No. 347,212
20 Claims. (Cl. 340—147)

ABSTRACT OF THE DISCLOSURE

A data acquisition system is provided where the data inputs can be signals representing rates, levels, levels occurring at a first pulse, or levels occurring at a peak pulse. Data input modifiers identify the type of inputs to the system. The identification signals are used to develop control signals for gating the input data to proper data conversion and accumulating devices.

---

This invention relates to a data monitoring system and more particularly to a physiological monitoring system for automatically measuring and digitally recording in visible form physiological variables presented as electrical signals representing steady state information, rates, or levels at a particular time.

The invention is directed to a system and apparatus for controlling the same rather than to the apparatus for making the particular measurements of the physiological variables. The control unit scans each physiological variable or input channel sequentially. Although the input channels are scanned sequentially, each channel can measure either a level, rate or a level occurring at a particular time. This is because each input channel consists of a group of individual data channels and the data channels of one group are identical to the data channels of another group. Modifiers are provided between the transducers for measuring the physiological variables and the data channels for receiving the signals representative of the measurements made. These modifiers function to see that the signal from the associated transducer gets to the proper data channel. This is very important because the rate measurement should not go to the data channel for receiving a level measurement, and vice versa, otherwise the system will not function properly. They also function to scale the input data so that the output data made available to a recorder requires no further calibration and each physiological variable measured and recorded will be in correct conventional units. Since no further calibration is required to make the recorded data meaningful, action can be taken immediately by the operator of the monitor. The modifiers also function to identify to the system whether the input is a level, rate or a level occurring at a particular time. This identification is important to the control of the system. Each data channel is connectable under the control of the scanning apparatus to an associated receptacle. The associated receptacle is adapted to receive the modifiers which are pluggable therein. Therefore, while the order for scanning the channels takes place in a fixed sequence, the order in which the modifiers and associated transducers are plugged into the channels can be changed as desired. Thus, the invention provides for an extremely simple program control or sequencing unit and yet permits great flexibility with regard to both the order and type of physiological variables measured. For example, it it were desired to measure temperature before measuring respiration rate, then modifiers connected to the transducers for making these measurements are merely plugged into the receptacles for the input channels in the preferred order.

In any cycle of operation, an internal time data channel is always scanned first. The data from the time channel is printed out or otherwise suitably recorded and thereafter switching from one input channel to the next occurs after the measurement for the one channel has been made and recorded. The data applied to the input channels is converted or accumulated depending upon the nature of the data. If the data is an electrical signal representing a level, then this data is converted by an analog to digital converter and the data in the converted form is transferred under control of readout circuitry to the printer or recorder. On the other hand, if the input data consists of a series of electrical impulses representing a rate, then these electrical impulses are accumulated for a period of time as determined by the type of measurement being made and the accumulated value is then transferred under control of the readout circuitry to the printer or recorder. Further, if the input information consists of a level condition occurring at a particular time, then the level condition is converted by the analog to digital converter at the particular time and thereafter the converted value is read out under control of the readout circuitry to the printer or recorder. The readout circuitry is rendered active after the desired conversion or accumulation of data has been made. The readout circuitry also controls the scanning or addressing circuitry for scanning the input channels.

Another very important feature of the invention is the control for skipping an input channel. In some instances it may be desirable to have a transducer connected to an input channel through its modifier and skip the scanning of that input channel for a desired period of time. Manually operable switches are provided for each input channel which can be set to effect the skipping function. These skip switches are connected to signal the scanning or addressing unit that it should advance to the next input channel. These skip switches, therefore, permit the operator of the physiological monitoring system to selectively suppress the reading and printout of any particular physiological variable for a desired period of time and thereafter permit the reading of this variable without making any disconnection of the transducer or its associated modifier.

The information read out by the readout circuitry is selectively made available to the printer or recorder. In other words, the converted or accumulated information is passed to the printer only if it is desired to have a printout. This selective control is activated either manually or by a selectively settable interval timer. Although the information is selectively transferred to the printer or recorder, it is continuously looked at by a high-low level alarm circuit. This circuit includes settable limit switches for each variable to be measured. If a variable measured is out of limits, a signal is developed for setting an alarm and for initiating a printout cycle.

Accordingly, a principal object of the invention is to provide an improved data monitoring system for automatically measuring and recording the measured variables in digital form.

Another very important object of the invention is to provide an improved monitoring system where the input channels each consist of a group of data channels which have identical individual data channels and there being an individual data channel for receiving an electrical signal for representing steady state information, a signal for representing information in the form of a rate, a signal for representing a level condition occurring at a particular time, and a signal for identifying the type of input connected to the input data channel.

Yet another object of the invention is to provide an improved monitoring system where the sequence in which the variables are monitored can be easily changed.

Still another object of the invention is to provide an improved monitoring system which is relatively inexpensive.

A more specific object of the invention is to provide an improved physiological data monitoring system.

A further object of the invention is to provide an improved physiological monitor when all required scaling is accomplished prior to conversion or accumulation of the data whereby further calibration to effect recording of the physiological variables in conventional units is unnecessary.

Still another object of the invention is to provide a monitoring system which includes means for skipping the digital measurement and recording of any variable being monitored.

The foregoing and other objects, features and advantages of the invention will be apparent from the following more particular description of a preferred embodiment of the invention, as illustrated in the accompanying drawings.

In the drawings:

FIG. 1 is a perspective view of a physiological monitor embodying the present invention;

FIGS. 2a, 2b, 2c taken together as in FIG. 4 represent a schematic circuit diagram of the invention;

GENERAL

Figure 1:
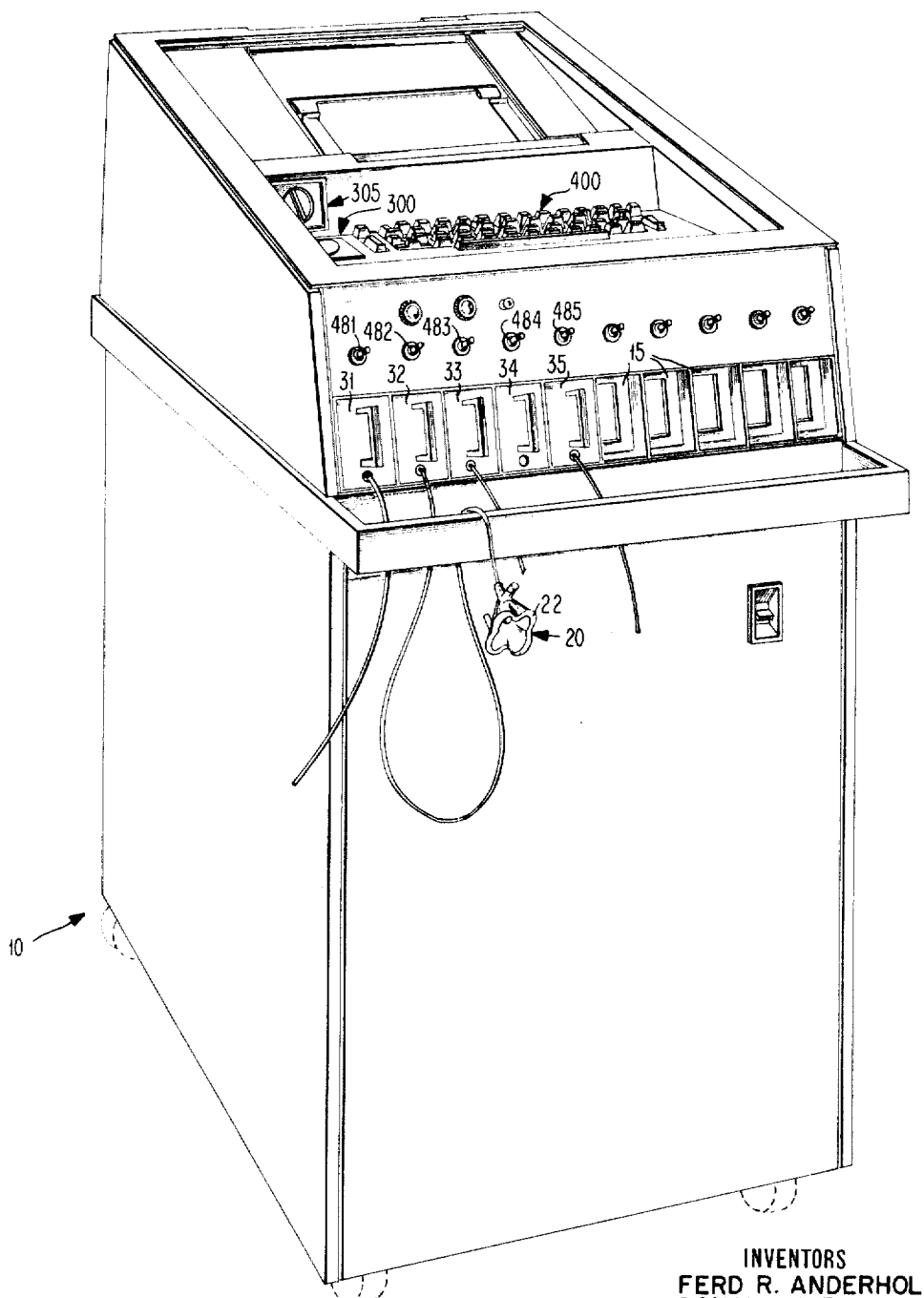

With reference to the drawings, and particularly to FIG. 1, the invention is illustrated by way of example as being embodied in a physiological monitor 10. The invention, although embodied as a physiological monitor, is broader in scope and can generally be considered a data acquisition system. As such, it accepts different types of inputs and each type of input can vary considerably in degree. For example, a level measurement is a type of input which can have a wide range, the range being a matter of degree. Further, the level can represent temperature, pressure, etc. Likewise, rate is a type of input and it too has a wide range. Respiration and pulse rates are rate variables measurable by the physiological monitor. Another type of measurement made is a level occurring at a particular time. Systolic and diastolic blood pressure are determined by measuring a pressure level at systole and diastole times respectively. Systole is the time of contraction of the heart. Whereas, diastole is the time of expansion or dilation. Because of the different types of inputs accepted by the system, it is necessary to direct the input signals to the proper apparatus for converting or accumulating the signals.

Figure 2A:
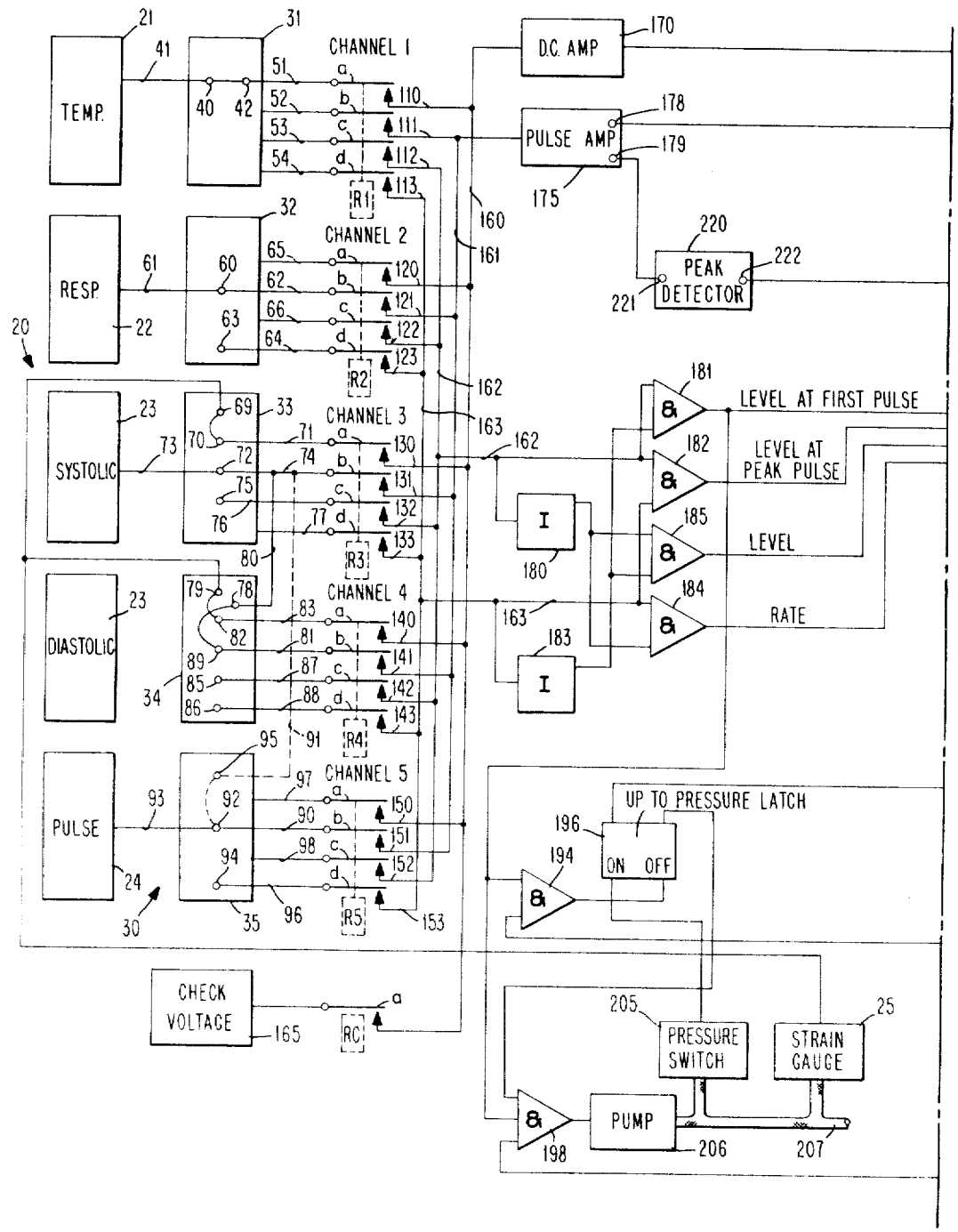
Figure 2B:
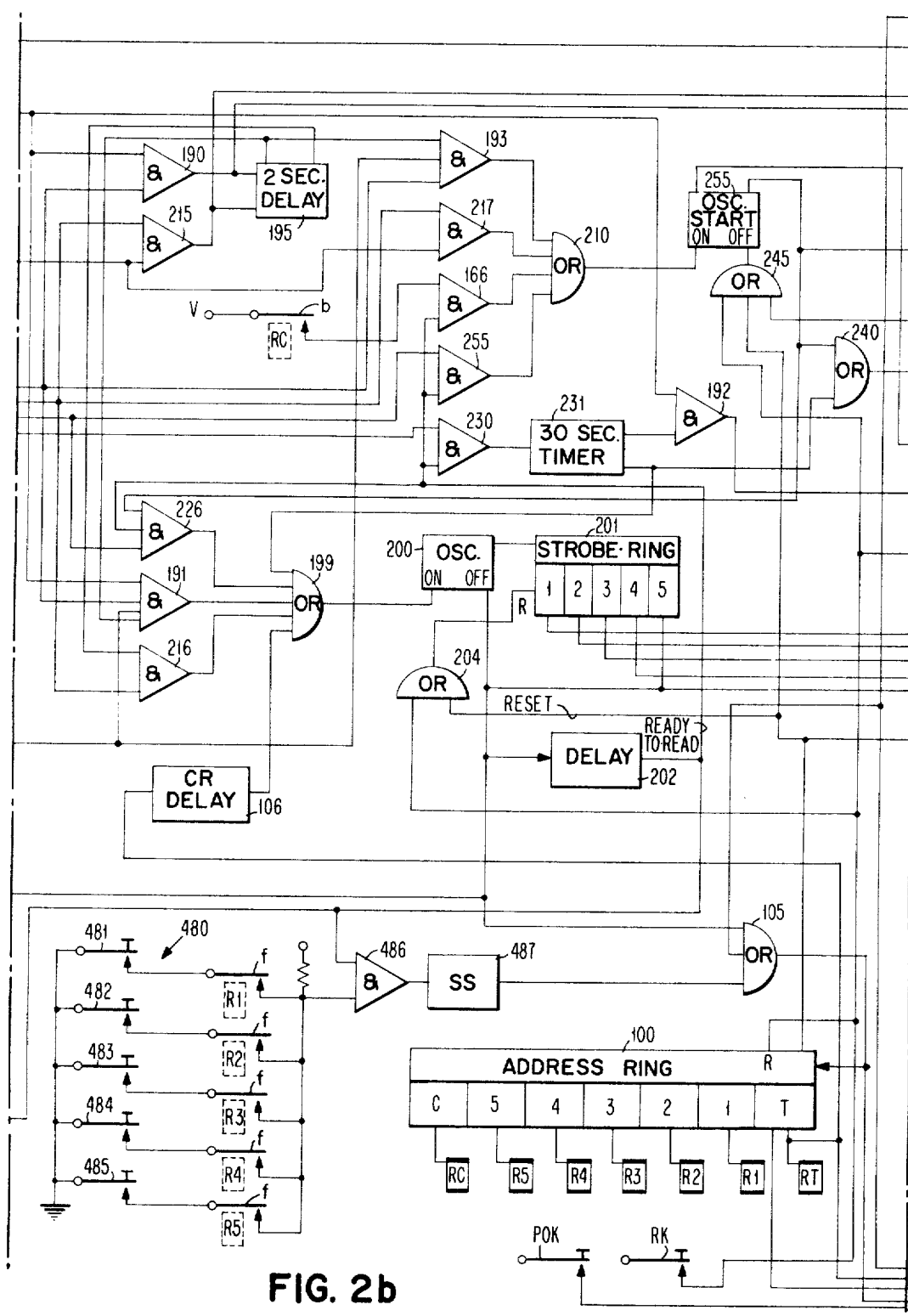
Figure 2C:
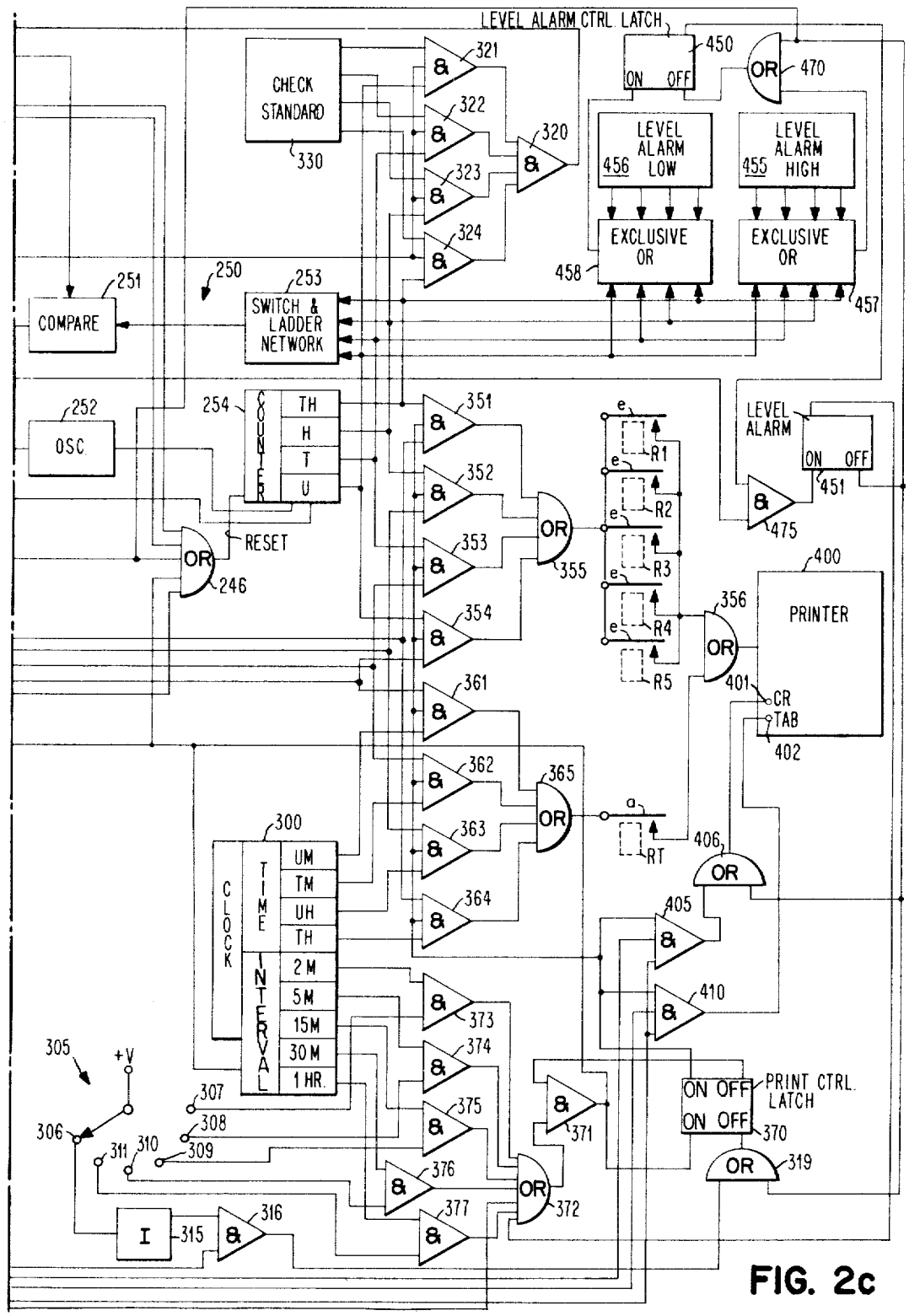

With reference to FIGS. 1 and 2, the various input signals are derived from transducers 20, only one transducer is shown in FIG. 1. In this example, the transducers 20 consist of a transducer 21 for measuring temperature, a transducer 22 for measuring respiration rate, a transducer 23 for measuring systolic and diastolic blood pressure, and a transducer 24 for measuring pulse rate. Of course, various other types of transducers could provide the input signals which are to be monitored by the system. The physiological monitor in FIG. 1 is shown as having ten receptacles; however, in FIG. 2, only five transducers 20 are shown. Again, these transducers could be other types of transducers for measuring physiological variables or they could be transducers for measuring process or other types of variables in industrial systems.

Transducers

The transducers 21, 22, 23 and 24 are only generally shown in FIG. 2. It is not essential to this invention to know the detailed structure of the transducers. However, to better understand the system, it should be noted that the transducers 20 are essentially medical probes for determining body temperature, respiration rate, both systolic and diastolic blood pressure, and pulse rate.

The temperature transducer 21 shown in block form in FIG. 2 is essentially a probe, not shown, containing a thermistor bead for measuring internal temperature. The output signal from the temperature probe is a DC electrical signal when the probe is connected in its modifier circuit.

The respiration rate transducer 22 in one particular instance consists of a face mask as shown in FIG. 1, containing a sensitive thermistor which is contacted by the tidal air of a patient. As the patient breathes, the thermistor in the mask is warmed by exhaled air and cooled by inhaled air. This causes a pulsating signal to be developed in the thermistor circuit. This signal, as will be seen later herein, is accumulated to provide an indication of the respiration rate.

In FIG. 2, a single transducer 23 is used to measure both systolic and diastolic blood pressure. The blood pressure transducer 23 can take several different forms. Successful measurements have been made with a finger-piece type of blood pressure transducer consisting of a finger cuff, not shown, which wraps around the finger and contains an inflatable bag, a light source and a light sensitive device. The inflatable bag is positioned on the finger to press against an artery. The light source and light sensitive device are separated by the flesh of the finger. Any pulsation of blood in the finger alters the amount of light reaching the light sensitive device. Air under pressure is conducted to the inflatable bag by a suitable flexible conductor until the pressure in the bag is sufficient to occlude the flow of blood in the finger. The pressure in the bag is then reduced at a constant rate. With the blood flow completely occluded, the signal from the transducer is at a steady state. When blood begins to flow past the point of occlusion, due to reduction of air pressure in the bag, an electrical impulse is generated because of a different amount of light impinging upon the light sensitive device. This electrical impulse is indicative of the occurrence of systolic blood pressure. The amount of air pressure at the time this signal occurs is then the value of systolic blood pressure. As the air pressure in the bag continues to be reduced, the pulsations first become increasingly greater in amplitude and reach a peak amplitude and then decrease in amplitude. The pulse of the greatest amplitude is indicative that diastolic blood pressure has been reached. The amount of air pressure at the time the peak signal occurs is the value of diastolic pressure.

The blood pressure transducer 23 can also consist of an arm cuff, not shown, which is applied to the patient's arm with the cuff aligned with the brachial artery. The arm cuff is provided with a conductor or hose which facilitates air pressurization of the cuff. A bellows is connected to the air supply and any change in pressure in the system is sensed by the bellows. The bellows opens or expands as pressure increases and closes or contracts as pressure decreases. The bellows contains a diaphragm and is attached to a lever between the ends thereof. The lever is pivotally mounted at one end and supports a dependingly attached reflector at its other end. A light source and light sensitive device spaced from each other face the reflector carried by the lever. Light waves from the light source strike the reflector and are directed therefrom to the light sensitive device. The intensity of the light waves striking the light sensitive device varies with the distance of the reflector from the light sensitive device. Hence, any change in pressure in the arm cuff is directly related to the amount of light impinging upon the light sensitive device. Air under pressure is admitted to the arm cuff until the pressure therein reaches a predetermined level which is great enough to occlude the flow of blood in the brachial artery. Thereafter, air is exhausted from the arm cuff at a constant rate. The signal developed due to the reduction in air pressure is modified by the heartbeat. As pressure is reduced in the cuff, each heartbeat causes a successively greater change in the pressure being measured and then successively a lesser change in pressure until all external restrictions to the flow of blood have been removed. The first pulsating signal of a given amplitude is indicative of the occurrence of systolic pressure and the last pulse of a given amplitude is indicative of the occurrence of diastolic pressure. The finger piece blood pressure transducer is schematically shown on p. 85 of the IBM Technical Disclosure Bulletin, volume 6, No. 1, dated June 1963. The arm cuff blood pressure measuring transducer is shown on p. 57 of the IBM Technical Disclosure Bulletin, volume 6, No. 7, dated December 1963.

Pulse rate transducer 24 can be a separate transducer or the pulse rate can be measured by the transducer 23. If the pulse rate transducer 24 is a separate transducer, then it is substantially the same type of transducer as the finger piece transducer 23 for measuring blood pressure except that it does not include the inflatable air bag.

*Modifiers*

Modifiers 30, FIGS. 1 and 2, are pluggable units which function to adapt the type of input signal to the associated input data channel. The modifiers 30 in essence enable substantially any type of transducer to be connected to any of the input data channels. The significance of this is that the input data channels are scanned in a fixed sequence, and therefore, the system would be very inflexible unless the order of connecting the transducers to the data channels could be changed as desired.

Figure 5:
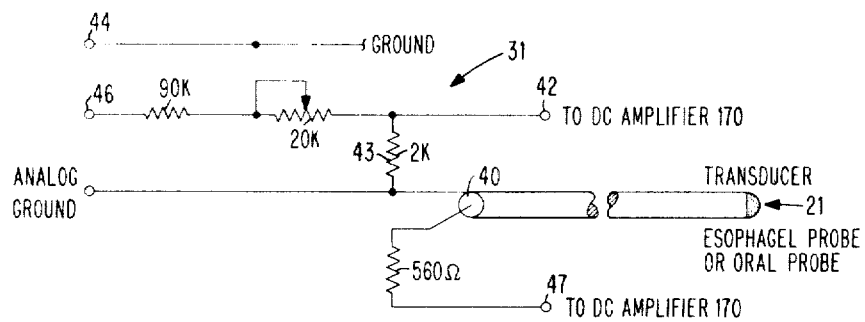
FIG. 5 is a schematic circuit diagram of the modifier circuit connected to the temperature transducer.

In this particular example, there are five modifiers 31, 32, 33, 34 and 35. Each of these modifiers are identical in some respects and different with regard to certain other features. All modifiers are equipped with the same pluggable connector which is adapted to be received by a receptacle 15 provided for each input channel. In FIG. 1, it is seen that there are ten receptacles for receiving modifiers; however, only five modifiers are connected in position. Each modifier is particularly wired for the type of input transducer to be associated therewith to provide the proper scaling for the measurement being made, to provide identification of the measurement and to provide the proper direction of the data being measured. It can be generally stated that the modifiers include electrical components for either attenuating or biasing the input signal. With reference to FIG. 5, the passive components are shown for modifier 31. Modifiers 32, 33, 34 and 35 also contain passive components which function to either attenuate or bias the signal, depending upon the type of input signal and provide the proper signal scaling, identification and direction.

With reference to FIG. 5, modifier 31 includes a terminal 40 which is connected to the input conductor 41 from the temperature transducer 21. The terminal 40 also connects to an output terminal 42 via a 2K resistor 43. The output terminal 42 connects to a contact element of the pluggable connector of modifier 31 which will be plugged into the receptacle of the input channel. While the receptacle is not shown in FIG. 2, the mating contact pin of the receptacle is connected to conductor 51. It can be generally stated that each receptacle for each input channel has the same number of contact pins and these pins are connected to back panel wiring in a manner well known to the person skilled in the art. The back panel wiring is connectable to the individual data channels for each input data channel. There are also back panel voltage busses connected to the receptacles and these are not shown. The modifier 31 also, among other terminals, FIG. 5, includes a terminal 44, for establishing a ground connection. A terminal 46 within modifier 31 is connected to terminal 42, via a 90K resistor and a 20K potentiometer. The 20K potentiometer enables the necessary adjustment or calibration for the temperature transducer 21. It should be noted that modifier 31 also has a terminal 47 which leads to amplifier 170. Although FIG. 2a shows only a single input to amplifier 170, for sake of simplicity, there are actually two inputs thereto and it functions to amplify the difference between the two input signals.

Conductors 52, 53 and 54, FIG. 2a, which lead to the receptacle for receiving modifier 31 will be inactive because the modifier 31 does not contain any contacts for connecting to the receptacle to which these conductors are attached. As it will be seen later herein, the absence of any signal appearing on conductors 53 and 54 is used to indicate that the type of transducer plugged into that input data channel is a level type of transducer and in this particular instance, it is a temperature transducer. Only the active terminals within the remaining modifiers will be described and it should be noted that each modifier has particular electrical components to provide the necessary scaling and signal adaptation. The terminals in the remaining modifiers for measurement identification will be described.

Modifier 32, FIG. 2a, includes the terminal 60 which is schematically shown as connecting conductor 61, which leads to the respiration transducer 22, to a conductor 62 which is connected to the receptacle for receiving modifier 32. A terminal 63 within modifier 32 provides a signal connection to conductor 64. There will be no signals appearing on conductors 65 and 66 because there are no terminals in the modifier 32 for bringing a signal to conductors 65 and 66. The presence of a signal on conductor 64 and absence of a signal on conductor 66 in combination provide an indication that the measurement is a rate measurement.

Modifier 33 is provided with terminals 69 and 70 for establishing a connection between a strain gage pressure transducer 25 and data channel conductor 71. Terminal 69 is connected by a jumper to terminal 70. Terminal 72 within modifier 33 connects conductor 73, leading to systolic transducer 23, to data channel conductor 74. Terminal 75 within modifier 33 establishes a connection to data channel conductor 76. Data channel conductor 77 will not receive any signal from modifier 33. The presence of a signal on conductor 76 and absence of a signal on conductor 77 in combination provide an indication that a level measurement is to be made at the occurrence of a first pulse and in this example, it is an indication that a systolic blood pressure measurement is to be made.

Because the same transducer 23 functions to measure both systolic and diastolic pressure, there is no input conductor from the transducer 23 to the modifier 34. Rather, a conductor 80 which can be considered a back panel wire, connects data channel conductor 74 to a terminal 78 which connects to terminal 89, the same being connected to data channel conductor 81. Terminal 79 within modifier 34 is connected to the strain gage pressure transducer 25 and is jumper connected to terminal 82 to provide a path from transducer 25 to data channel conductor 83. Terminals 85 and 86 within modifier 34 provide signals to data channel conductors 87 and 88 respectively. The signals on conductors 85 and 86 in combination provide an indication that a diastolic blood pressure measurement is to be made.

In view of the fact that the blood pressure transducer 23 can also measure pulse rate, a back panel wire connection can be made between data channel conductor 74 and a terminal 95 within modifier 35 which in turn is jumper connected to terminal 92 the same being connected to data channel conductor 90. This alternate connection is shown by the dashed line 91. If a separate pulse transducer 24 is used, then terminal 92 within modifier 35 connects conductor 93, which leads to pulse transducer 24, to the data channel conductor 90. Terminal 94 within modifier 35 provides an input to data channel conductor 96. Data channel conductors 97 and 98 do not receive any signals from modifier 35. Since data channel conductors 96 and 98 have and do not have signals thereon respectively, they provide an indication that a rate measurement is to be made.

SYSTEM CONTROL

Addressing of data input channels

The scanning or addressing of the data input channels in FIG. 2 is under control of an address ring 100. The address ring 100 in this example, is a seven-position ring with five of the positions for addressing data channels 1 through 5 respectively. While there are ten data channels shown in the machine in FIG. 1, only five of these ten data channels are shown in FIG. 2. Hence, if all ten of the data channels were shown, then address ring 100 would have twelve positions where ten of them are used for addressing the input data channels. The first position of the address ring 100 is a time position and this position is used to address an internal time channel or clock 300. The last position of the ring 100 is a check position and this position initiates a cycle where voltages, amplifiers and conversion circuits are checked and compared with a fixed value to ascertain whether or not these elements are properly functioning and if they are, the ring 100 is indexed or advanced from the check position to the time position. If the elements are not properly functioning, the address ring remains in the check position and a ready light, not shown, is switched off and remains in the off position. It is thus seen that the address ring 100 always includes a time position as a first position and a check position as the last position, with a number of intermediate positions, depending upon the number of channels to be addressed.

The set outputs of the time position and channel positions 1, 2, 3, 4 and 5 and the check position are connected to relays RT, R1, R2, R3, R4, R5 and RC respectively. Hence, whenever a position of the ring 100 is active, its associated relay will be energized.

When relay R1 is energized, its associated normally open contacts R1a, R1b, R1c and R1d are closed to connect conductors 51, 52, 53 and 54 with conductors 110, 111, 112 and 113 respectively. Conductors 110, 111, 112 and 113 connect to conductors 160, 161, 162 and 163 respectively. The conductors 160, 161, 162 and 163 can be considered as buss conductors and they respectively connect to conductors 120, 121, 122 and 123 of channel 2 and conductors 130, 131, 132 and 133 of channel 3 and conductors 140, 141, 142, 143 of channel 4 and conductors 150, 151, 152, 153 of channel 5. It should be noted that when relays R2, R3, R4 and R5 are energized, their associated normally open contacts are closed to establish connections between the individual channel conductors of the particular channel with the associated conductors leading to the buss conductors 160, 161, 162 and 163. Block 165 consisting of a check voltage is connectable to conductor 160 through normally open contact RCa of relay RC.

Conductor 160 functions to transmit a level condition and it is connected to the input of a DC amplifier 170. The DC amplifier 170 functions to amplify the DC or level signals such as those signals coming from temperature transducer 21 and strain gage pressure transducer 25. The output of the DC amplifier 170 is connected to an input of a comparator 251 of analog to digital converter 250. The analog to digital converter 250 will be described later herein.

Figure 6:
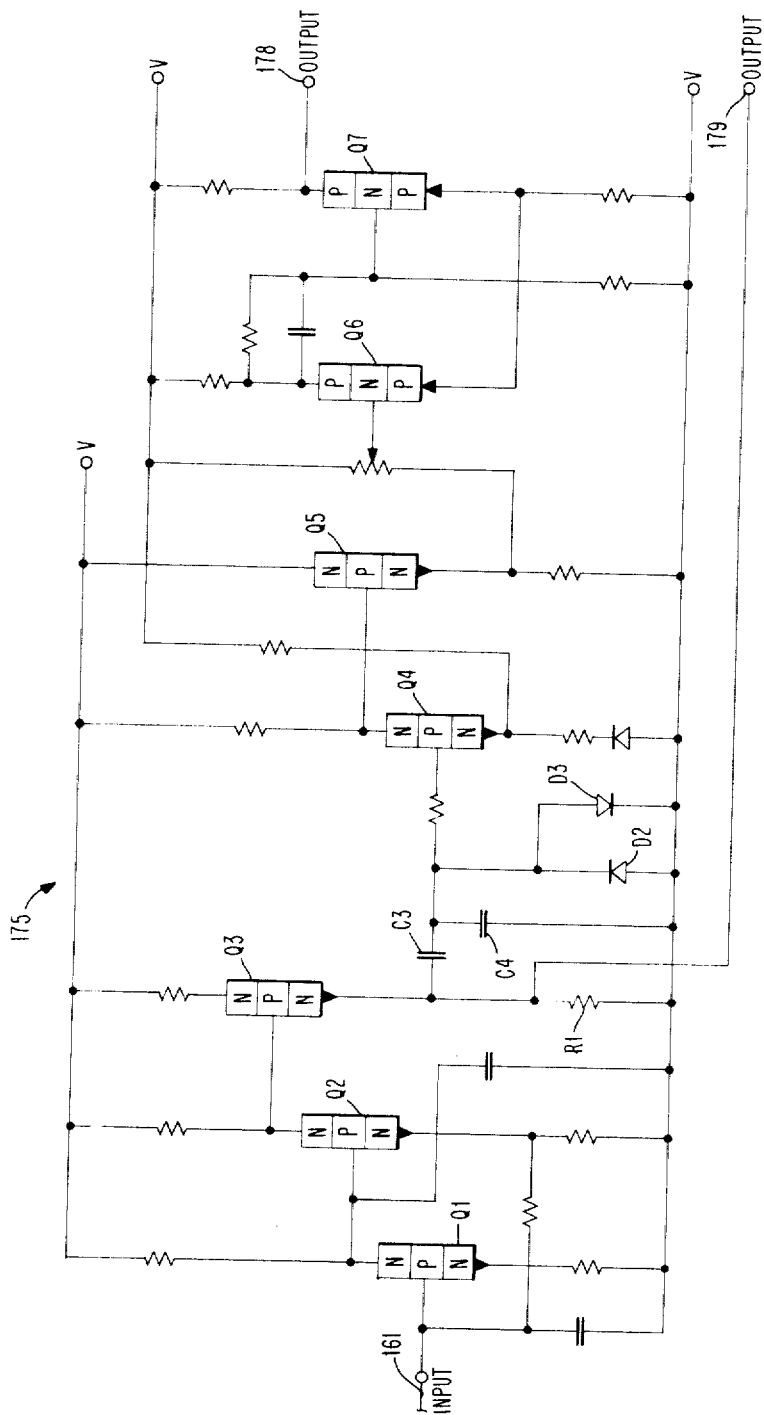
FIG. 6 is a schematic circuit diagram of the pulse amplifier.

Conductor 161 functions to carry electrical impulses and it connects to the input of a pulse amplifier 175. The pulse amplifier 175 provides an output signal which is indicative of the occurrence of an input pulse and also an output signal indicative of the relative magnitude of the input pulse. The details of the pulse amplifier are shown in FIG. 6. With reference to this FIG. 6, transistors Q1, Q2, and Q3 are connected to form a linear amplifier. The output of the linear amplifier is taken from transistor Q3 and it is shaped by a pulse shaper consisting of resistor R1, capacitors C3 and C4 and diodes D2 and D3. The shaped pulse is applied to the input of the pulse amplifier section comprising transistors Q4 and Q5. The output from the pulse amplifier formed by transistors Q4 and Q5 is supplied to a Schmitt trigger section consisting of transistors Q6 and Q7. The saturated output is taken from transistor Q7 which has its collector connected to output terminal 178. Hence, for each pulse applied to input terminal 176, a substantially square output pulse will appear at terminal 178. The unsaturated output appears at terminal 179 which is connected to the emitter of transistor Q3. Hence, for each input pulse applied to the terminal 176, a signal will appear at terminal 175, which has a magnitude proportional to the input signal.

With reference again to FIG. 2, the output terminal 178 of pulse amplifier 175 is connected to inputs of logical AND circuits 190, 191 and 192. The other inputs to these logical AND circuits will be described shortly. It can be generally stated that these other inputs are essentially gating inputs which relate to the kind or type of measurement being made. At this time, a greater appreciation for the system control of the monitor will be had if the gating or control signals are described.

Control signals are developed to represent each kind of measurement being made and in this example, there are four different kinds of measurement, namely a level occurring at the time of a first pulse such as systolic blood pressure, a level occurring at the time of a peak pulse such as diastolic blood pressure, level measurements and rate measurements. In order to derive these signals, buss conductor 162 is connected to the input of inverter 180 and to inputs of logical AND circuits 181 and 182. Buss conductor 163 is connected to an input of an inverter 183 and to inputs of logical AND circuits of 182 and 184. The output of inverter 180 is connected to inputs of logical AND circuits 184 and 185. The output of inverter 183 is connected to inputs of logical AND circuits 181 and 185. By this arrangement, signals appearing at the outputs of logical AND circuits 181, 182, 184 and 185 will be indicative of a level at a first pulse or systolic, a level at a peak pulse or diastolic, rate and level respectively. This can be easily verified by further examination of the inputs to these logical AND circuits. For example, if relay R1 is energized, there is an absence of a signal on either conductor 162 or 163 because there are no signals present on conductors 53 and 54 which connect to conductors 112 and 113 the same then connecting to conductors 162 and 163. The absence of a signal on either conductor will produce an output from inverters 180 and 183. These outputs will cause the logical AND circuit 185 to pass an output. It will be recalled that an output signal from logical AND circuit 185 is indicative of a level measurement. Temperature transducer 21 measures a level and hence, its modifier 31 causes the proper signal to be developed, which is indicative that a level is being measured for that particular input channel. It should be obvious that if temperature transducer 21 and its associated modifier 31 were connected into channel 2, then when relay R2 is energized, a signal would be passed via logical AND circuit 185 to indicate that level measurement is being made, for that particular channel.

Considering the respiration rate transducer 22 and its associated modifier 32 are plugged into channel 2 and pulse transducer 24 and its associated modifier 35 are plugged into channel 5, a signal will be passed by logical AND circuit 184 when either relay R2 or R5 is energized to indicate that a rate measurement is being made. This is because when either relay R2 or R5 is energized, there will be a signal on conductor 163 but none on conductor 162. Hence, the input conditions to logical AND circuit 184 are satisfied and it will therefore pass a signal at its output.

It is seen that when relay R3 is energized, a signal will be passed by logical AND circuit 181 because there will be a signal on conductor 162 but none on conductor 163 and therefore, the input conditions to logical AND circuit 181 will be satisfied. Similarly, when relay R4 is energized, there will be a signal at the output of logical AND circuit 182 because both conductors 162 and 163 will have a signal and hence, the input conditions to logical AND circuit 182 will be satisfied.

The output of logical AND circuit 181 which is indicative of a systolic blood pressure measurement is connected to inputs of logical AND circuits 190, 191, 193 and 194. The output of logical AND circuit 190 is connected to an input of a two-second delay 195. Logical AND circuit 190 also has an input connected to the output terminal 178 of pulse amplifier 175. The two-second delay 195 is therefore active during the measurement of systolic blood pressure. Logical AND circuit 191 when properly conditioned, passes a signal for turning ON an oscillator 200 for advancing a strobe ring 201 which, as it will be seen shortly, develops a series of five electrical impulses. Four of these impulses are used for data readout purposes, the fifth pulse is used to advance the address ring 100, and a delayed fifth pulse is used as a gating signal in the next operation. The output of logical AND circuit 191 is connected to an input of a logical OR circuit 199. The output of logical OR circuit 199 is connected to the ON terminal of oscillator 200 which drives or advances the strobe ring 201. The fifth output from strobe ring 201 is connected to the OFF terminal of the oscillator 200. Hence, ring 201 runs through one cycle and then stops. It remains in the stopped condition until the oscillator 200 is started again by a pulse applied thereto via logical OR circuit 199.

Logical AND circuit 191 in addition to the input from pulse amplifier 175 has an input connected from the ON side of the two-second delay 195, and an input connected to the ON side of the up to pressure latch 196. Hence, logical AND circuit 191 will pass an output to activate the strobe ring 201 only after a first impulse has been passed by pulse amplifier 175 and another impulse is passed by that amplifier within two seconds and the up to pressure latch 196 is on. This arrangement tends to insure that the first pulse passed by the pulse amplifier when in the systolic mode is truly a pulse indicative of the occurrence of systolic pressure and not merely an extraneous pulse produced by artifact.

Logical AND circuit 193 which is also conditioned by logical AND circuit 181 has an input connected to the ON terminal of the two-second delay 195 and an input connected to the ON output of an up to pressure latch 196. The up to pressure latch 196 has its set or ON terminal connected to the output of an adjustably settable pressure switch 205 which is connected in the discharge side of air pump 206 by means of conductor 207 which leads also to strain gage pressure transducer 25 and to an air cuff, not shown. By this arrangement, the up to pressure latch 196 is switched ON when air under pressure discharged by pump 206 has reached a particular value, for example, such as 300 mm. of mercury.

Hence, logical AND circuit 193 will be conditioned to pass an output if a second pulse is passed by amplifier 175 within two seconds after a first pulse has been passed by that amplifier and if latch 196 is in the set or ON condition and when operating in the systolic mode. The output of logical AND circuit 193 is connected to an input of a logical OR circuit 210 the same having its output connected to the ON or set input of an oscillator start latch 255. The set or ON output of the oscillator start latch 255 is connected to the ON terminal of oscillator 252 of the analog to digital converter 250. Oscillator 252 will be turned ON only when the oscillator start latch 255 is set to the ON condition.

Logical AND circuit 194 which is also conditioned when in the systolic mode has an input connected to the fifth position of the strobe ring 201. It will be recalled that the strobe ring 201 is activated by the logical AND circuit 191 when in the systolic mode, and consequently, the inputs to logical AND circuit 194 will be satisfied at the beginning of a systolic measurement. The output of logical AND circuit 194 is connected to the OFF input of up to pressure latch 196. The reason for including this latter described circuit is to insure that the air pressure developed by air pump 206 again reaches the proper limit in the event of a second measurement of systolic blood pressure.

The output of logical AND circuit 181 is also connected to an input of logical AND circuit 198 which also has an input connected to the OFF output of up to pressure latch 196 and to the output of delay 202. Delay 202 has its input connected to the fifth position of strobe ring 201. Delay 202 functions to provide time for the circuits to settle down. The output of logical AND circuit 198 is connected to the ON control of the pump 206. Hence, if logical AND circuit 198 passes a signal, pump 206 is turned ON, otherwise it is OFF.

Figure 3:
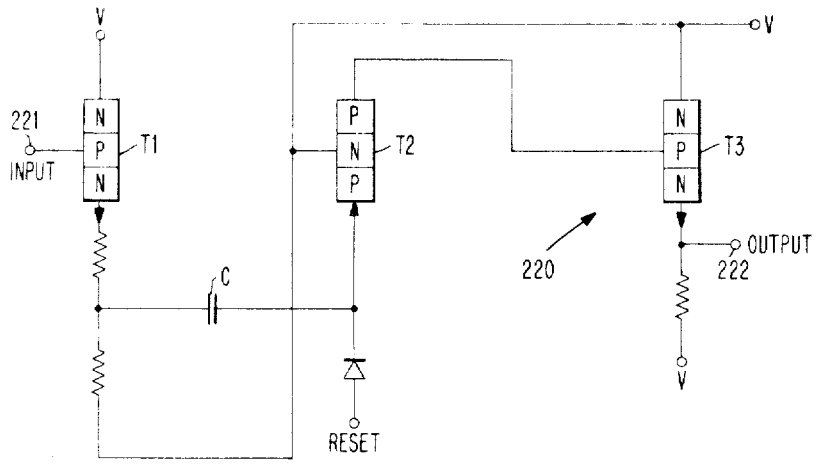
FIG. 3 is a schematic circuit diagram of the peak detector.
Figure 4:
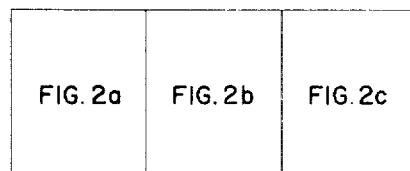
FIG. 4 shows the arrangement of FIGS. 2a, 2b, and 2c.

When in the diastolic mode, there will be a signal at the output of logical AND circuit 182 which is connected to inputs of logical AND circuits 215, 216 and 217. Logical AND circuit 215 is similar in function to logical AND circuit 190. It has its output connected to the two-second delay 195 and its other input is connected to the output of a peak detector 220. The input to peak detector 220 is connected to output terminal 179 of the pulse amplifier 175. The peak detector 220 is shown in detail in FIG. 3 and functions to provide a pulse at its output for every voltage pulse applied to its input which is larger than any preceding voltage pulse. The function of the peak detector 220 will be appreciated greater when the measurement of diastolic blood pressure is described. Very briefly, the peak detector 220 has an input terminal 221 connected to output terminal 179 of pulse amplifier 175. Input terminal 221 is connected to the base of a transistor T1. By this connection, the first positive pulse received at input terminal 221 turns transistor T1 ON. In view of the fact that transistor T1 is connected in an emitter follower configuration, the base voltage is transferred to the emitter of transistor T1 and capacitor C begins to charge. At this point, transistor T2 begins to conduct and biases transistor T3 to a state of conduction, transistor T3 being normally non-conductive. When transistor T3 conducts, its collector voltage is transferred to output terminal 222. If a succeeding pulse applied to input terminal 221 is equal to or less than the magnitude of the preceding pulse, then capacitor C serves to bias the emitter of transistor T1 so that it will not conduct. However, if the subsequent pulse is of greater magnitude, then the input voltage will exceed the voltage on the emitter of transistor T1 and transistor T1 will therefore conduct to produce an output pulse at output terminal 222.

While the output of logical AND circuit 215 is connected to an input of the two-second delay 195, it is the off output of the two-second delay which is connected to an input of logical AND circuit 216. By this arrangement, the off output of the two-second delay 195 will be active two seconds after the peak signal has been detected by peak detector 220. This substantially assures that a peak signal has been detected before conditioning the circuits for permitting data indicative of diastolic blood pressure to pass from counter 254 to printer 400. While this will become more lucid later herein, it should be noted that the output of logical AND circuit 216 is connected to an input of logical OR circuit 199 which, as it will be recalled, has its output connected to the oscillator 200 for advancing strobe ring 201.

Logical AND circuit 217 in addition to having an input connected to the output of logical AND circuit 182, also has an input connected to the output of peak detector 220. The output of logical AND circuit 217 is connected to an input of logical OR circuit 210. Hence, logical AND circuit 217 will pass an impulse via logical OR circuit 210 to the oscillator start latch 255. It is thus seen that when in either the systolic or diastolic mode, the oscillator start latch 255 will be turned ON. It should also be noted at this time that irrespective of the sequence for making other measurements, the modifier 33 must be plugged into a receptacle of a channel preceding the modifier 34 because, in this system, the systolic blood pressure is always derived prior to the measurement of diastolic pressure. Additionally, if both systolic and diastolic blood pressure are to be measured, then a diastolic modifier 34 must be plugged into a receptacle of a channel immediately succeeding the channel to which the systolic modifier 33 is plugged.

The logical AND circuit 185 for providing an indication when operating in the level mode has its output connected to the inputs of logical AND circuits 225 and 226. Logical AND circuit 225 also has an input connected to the output of delay 202, which, as it will be recalled, develops a delay signal to permit the circuits to settle down and after the delay the signal therefrom is called READY TO READ. The output of logical AND circuit 225 is connected to an input of logical OR circuit 210. Hence, when in the level mode, the oscillator start latch 255 will also be set when the inputs to logical AND circuit 225 are satisfied.

Logical AND circuit 226 has an input connected to the OFF output of the oscillator start latch 255 and an input connected to the output of delay 202. As it will be seen later herein, the oscillator start latch 255 is switched to its off state after the analog to digital converter 250 has performed a conversion. Therefore, the inputs to logical AND circuit 226 will be satisfied after a conversion has been made by the analog to digital converter 250 when operating in a level mode. The output of logical AND circuit 226 is connected to an input of logical OR circuit 199. This connection, of course, develops the strobe pulses for gating the characters in counter 254 to printer 400.

The output of logical AND circuit 184, which is indicative of operating in a rate mode, is connected to an input of logical AND circuit 230. Logical AND circuit 230 also has an input connected to the output of delay 202. The output of logical AND circuit 230 is connected to the input of a thirty second timer circuit 231. The thirty second timer circuit 231 has one output which is up for thirty seconds and this output is connected to an input of logical AND circuit 192 and it has another output which is up at the end of the measured thirty seconds which is connected to an input of a logical OR circuit 240 and to an input of logical OR circuit 199. The thirty second timer circuit 231 can be of the type shown and described on p. 75 of the IBM Technical Disclosure Bulletin, vol. 6, No. 1, dated June 1963. Logical AND circuit 192 also has an input connected to terminal 178 of pulse amplifier 175 and the output of logical AND circuit 192 is connected to the binary 2 conductor of the units position of counter 254. This provides the proper scaling for pulses in rate per minute. Logical OR circuit 199 passes the signal from the thirty second timer 231 to initiate the development of strobe pulses by strobe ring 201. Logical OR circuit 240 passes a signal for sensing the condition of a level alarm control latch 450 which will be described in greater detail in connection with the high-low limit level alarm feature. However, it can be mentioned at this time that logical OR circuit 240 also has an input connected to the OFF output of oscillator start latch 255. Hence, any signal passed by logical OR circuit 240 is a gating type of signal for sensing the condition of the level alarm control latch 450.

*Readout control*

Readout of data from counter 254 or from clock 300 is parallel by bit and serial by digit or character. In order to simplify the explanation of how data is readout from counter 254 and clock 300, a character line rather than individual bit lines is shown for each position of the counter 254 and clock 300. The characters can be represented by any suitable code and in this example, the characters are represented by the binary decimal code. In view of the fact that the characters are to be readout serially from counter 254 and clock 300 to printer 400, the first four positions of the strobe ring are connected to provide gating or readout signals to logical AND circuits 351, 352, 353 and 354 which are also connected to the thousands, hundreds, tens and units outputs of counter 254. The first, second, third and fourth positions of the strobe ring 201 are connected to inputs of logical AND circuits 351, 352, 353 and 354 respectively. By this arrangement, the high order position of counter 254 will be readout first. This is because printer 400 prints from the high order position of a field to the low order position. Logical AND circuits 351, 352, 353 and 354 each has an input connected to the ON output of print control latch 370 which controls the readout of data from counter 254 and clock 300 to printer 400. The setting and resetting of print control latch 370 will be described shortly.

In order that data can be passed from counter 254 at the proper time, the outputs of logical AND circuits 351, 352, 353 and 354 are connected to inputs of a logical OR circuit 355. The output of logical OR circuit 355 is commonly connected to the normally open side of contacts R1e, R2e, R3e, R4e and R5e. The other side of these contacts are connected as inputs to a logical OR circuit 356, which has its output connected to the input of printer 400.

Logical AND circuits 361, 362, 363 and 364 are respectively connected to the units minutes, tens minutes, units hours and tens hours positions of clock 300 and to the fourth, third, second and first positions of strobe ring 201. Additionally, each of the logical AND circuits 361, 362, 363 and 364 has an input connected to the ON output of print control latch 370. Hence, by this arrangement, data will be gated from clock 300 high order position first and only if the print control latch 370 is in the ON state. The outputs of logical AND circuits 361, 362, 363 and 364 are connected to inputs of a logical OR circuit 365 which has its output connected to an input of logical OR circuit 356 through relay contact RTa. Thus with the print control latch 370 ON and with the address ring 100 in the time position, data representing time will be passed from clock 300 to printer 400. The clock 300 can be any suitable clock which provides output signals indicative of time and in this particular instance, there is a units position for both minutes and hours as well as a tens position for both minutes and hours. The clock is resettable and consequently it can provide an indication of real or elapsed time. Clock 300, as it will be seen later herein, also has an interval timer to provide an output signal at the lapse of two, five, fifteen and thirty minutes and one hour.

The print control latch 370 is settable by a manually operable printout key POK, by the occurrence of a particular time interval, or by the level alarm control latch 450 being in the off condition at a particular time. The ON or set terminal of the print control latch 370 is connected to the output of a logical AND circuit 371 which has one input connected to the OFF output of print control latch 370 and another input connected to the output of a logical OR circuit 372.

The logical OR circuit 372 enables alternate ways of setting the print control latch 370 via the logical AND circuit 371. The printout key POK is connected to an input of logical OR circuit 372 which also has inputs from logical AND circuits 373, 374, 375 and 376 and an input from the ON output of a level alarm 451. The logical AND circuits 373, 374, 375 and 376 and 377 have inputs from the clock 300 representing a time of two, five, fifteen and thirty minutes and one hour, and inputs from terminals 307, 308, 309, 310, 311 of an interval timer switch 305. Hence, by this arrangement, if the manually settable interval timer switch 305 is set to the two minute interval, then at the end of a two-minute interval the time in clock 300 will be transferred to printer 400 and address ring 100 will step through a sequence whereby data in counter 254 will be sequentially readout to the printer 400.

Terminal 306 of the interval timer switch 305 is the continuous printout interval terminal. It is connected to the input of an inverter 315 which has its output connected to the input of a logical AND circuit 316. The logical AND circuit 316 has another input connected to the output of logical AND circuit 320. Logical AND circuit 320 has inputs from logical AND circuits 321, 322, 323 and 324. These logical AND circuits function to perform a comparison during the check portion of the cycle between the value in counter 254 as a result of conversion of check voltage 165 with a standard value represented by check standard block 330. This is accomplished by connecting the four positions of counter 254 and check standard 330 to inputs of logical AND circuits 321, 322, 323 and 324 respectively. Each of these logical AND circuits also have inputs connected to the OFF output of oscillator start latch 255. The output of logical AND circuit 316 is connected to an input of a logical OR circuit 319 which has its output connected to the OFF terminal of the print control latch 370. Therefore, when operating in the continuous printout mode, the print control latch 370 will remain in the ON or set condition. However, when not operating in the continuous mode, the print control latch 370 will be switched OFF after each cycle of operation.

*High-low level alarm circuit*

While printout occurs only at the times designated by the interval timer switch 305, the data entered into the input channels is continuously looked at by the high-low level alarm circuit. The high-low level alarm circuit consists of manually settable high and low level limit switches schematically represented by blocks 455 and 456. The high-level alarm switches 455 are connected to exclusive OR circuits 457 and the low level alarm switches are connected to exclusive OR circuits 458. It should be noted that there are high and low level alarm switches 455 and 456 for each channel position. The output positions of counter 254 are also connected to inputs of exclusive OR circuits 457 and 458. It is thus seen that exclusive OR circuits 457 and 458 function to compare the value in the counter 254 with the values set up by the high and low level alarm limit switches 455 and 456.

The off input terminal of the level alarm control latch 450 is connected to the output of a logical OR circuit 470 which has an input from the exclusive OR circuits 457. It should be noted that this input is represented by a single line, although there are exclusive OR circuits for each position of the counter and each position of the level alarm switches. Logical OR circuit 470 has an input from reset key RK. Before starting an operation, the reset key is manually operated to reset the circuits to which it is connected. Hence, the level alarm control latch is initially set at its OFF condition.

During a cycle of operation, counter 254 will be receiving advance pulses from oscillator 252 when the same is ON. As the value in counter 254 increases, it will either reach or not reach the low level alarm condition. If it reaches the low level value or goes beyond the low level value, then the level alarm control latch 450 is set to the ON condition. If at the end of a conversion, the value in counter 254 has not reached the low level set by switches 456, then the level alarm control latch 450 will be in the OFF state at that time. This condition is sensed by logical AND circuit 475 which has an input connected to the OFF side of the level alarm control latch 450 and an input connected to the output of logical OR circuit 240. The output of logical AND circuit 475 is connected to the ON or set input of the level alarm 451. Hence, if the value in counter 254 is below the low limit, the level alarm control latch will never be set and the level alarm 451 will consequently be activated.

On the other hand, if the value in the counter equals or exceeds the low value set in switches 456, then the level alarm control latch 450 will be set and the level alarm 451 will not be activated. This is true provided the value in counter 254 does not exceed the value set by the high level alarm switches 455 during a conversion or an accumulation. If the value in counter 254 exceeds the value set by the high level alarm switches 455, a signal will be passed by exclusive OR circuits 457 to the OFF terminal of the level alarm control latch 450 which was set to the ON condition when the value in counter 254 equalled or exceeded the value set by the low level alarm switches 456. Consequently, the level alarm control latch 450 will be in the OFF state at the end of conversion and under this condition, the level alarm 451 will be activated to the ON condition.

The level alarm 451 is connected to activate an alarm light or other alarm device, not shown. The ON output of the level alarm 451 is also connected to logical OR circuit 372 so as to turn on the print control latch 370 when the level alarm is ON. Of course, with the print control latch 370 in the ON condition, the value in counter 254 will be readout during the next cycle as strobe ring 201 becomes activated.

It should be noted that the printer 400 includes a carriage return terminal 401 for receiving a signal to initiate a carriage return and a tabulating terminal 402 for receiving a tab signal. The terminal 401 is connected to the output of a logical AND circuit 405 via logical OR circuit 406. Logical AND circuit 405 has an input connected to the output of a logical OR circuit 105, an input connected to the set output of the time position of ring 100 and an input connected to the ON output of print control latch 370. Hence, logical AND circuit 405 will be conditioned to pass a signal to initiate a carriage return when the logical OR circuit 105 receives a signal to advance ring 100 to the time position. The set output of the time position of address ring 100 is also connected to the input of a delay 106 which functions to provide sufficient time for the carriage of printer 400 to return before developing the strobe pulses through strobe ring 201 which gate the time data from clock 300 to printer 400.

The printer 400 is tabulated every time the address ring 100 is advanced from channel to channel except during the time that it is advanced from the check position to the time position. The tabulating terminal 402 is connected to the output of a logical AND circuit 410 which has an input connected to the output of logical OR circuit 105, an input connected to the OFF output of the time position of address ring 100 and an input connected to the ON or set terminal of print control latch 370.

The printer 400 can be any serial printer having the controls mentioned. The IBM Selectric I/O Writer described in a publication entitled IBM ETD Customer Engineering Series 73 Selectric I/O Writer Instruction Manual dated Nov. 12, 1962, Form 241–5159–1 is quite suitable for printer 400. In this printer, the printhead is advanced relative to the platen rather than having the paper move laterally. Hence, the carriage return signal functions to return the printhead to the left-most position of the printer. The tabulating signal causes the printhead to space from one field to another field.

*Skip circuits*

The skip circuit 480 consists of manually settable switches 481, 482, 483, 484 and 485. These switches are connected between ground potential and an input to a logical AND circuit 486 through normally open relay contacts R1*f*, R2*f*, R3*f*, R4*f* and R5*f* respectively. The logical AND circuit 486 also has an input connected to the output of delay 202. The output of logical AND circuit 486 is connected to the input of a singleshot multivibrator 487 which has its output connected to an input of logical OR circuit 105. The output of logical OR circuit 105, it will be recalled, is connected to advance the address ring 100. The singleshot multivibrator 487 functions to develop a signal which is very similar to the fifth strobe pulse from strobe ring 201 which also advances the address ring 100. Hence, the signal developed by the singleshot multivibrator 487 is utilized to advance the address ring 100. When any of the switches 481, 482, 483, 484 or 485 is moved to the closed position, then the associated input channel is skipped. This permits an operator to skip the reading of data on any input channel.

*Reset circuits*

Reset key RK and signals flowing from logical AND circuit 371 perform certain reset functions. When the reset key RK is closed, it passes a signal for resetting the level alarm circuits, resetting the oscillator start trigger 255 to OFF, resetting the strobe ring 201, resetting print control latch 370 to OFF, initiating a carriage return for printer 400, resetting the address ring 100, and for resetting counter 254. The output of logical AND circuit 371 is connected to set the address ring 100 to the time position, to reset the oscillator start latch 255 OFF, to reset the strobe ring 201, to reset the interval timer in the clock 300 and to reset counter 254.

*A/D converter*

Analog to digital converter 250 can take several suitable forms and in this example, it consists of comparator 251, oscillator 252, switches and ladder network 253 and counter 254. The operation of the analog to digital converter is under control of oscillator start latch 255.

When oscillator start latch 255 is switched ON, oscillator 252 is started. The pulses from oscillator 252 advance counter 254. The count in counter 254 is applied to the switches and ladder network 253. The switches and ladder network 253, which consist of switches connected to a resistor ladder network of a type well known in the art, develop a comparison voltage. This comparison voltage increases in incremental units for each pulse applied to counter 254 and is applied to comparator 251. Comparator 251 also receives the unknown analog voltage from amplifier 170. When the voltage developed by the switches and ladder network 253 equals the unknown analog voltage from amplifier 170, comparator 251 emits a signal which is applied through logical OR circuit 245 to the OFF input of the oscillator start latch 252. With the oscillator start latch 252 switched to its OFF state, oscillator 252 is turned OFF and counter 254 is no longer advanced. The count in the counter 254, at this time, then is the digital value of the unknown analog input from amplifier 170.

MODE OF OPERATION

An operation starts by depressing the reset key RK whereby the level alarm circuits, the oscillator start latch 255, the oscillator 200, the print control latch 370, the carriage of printer 400, the address ring 100, and the counter 254 are all reset. Next the printout key POK is depressed and this causes the print control latch 370 to be set via logical OR circuit 372 and logical AND circuit 371. Since logical AND circuit 371 passes an impulse to set the print control latch 370, it will also pass a pulse for setting the address ring 100 to the time position. With the address ring 100 in the time position, the set output thereof will energize the relay RT and will also turn on the oscillator 200 via the carriage return delay 106 and the logical OR circuit 199.

The first four strobe pulses from strobe ring 201 sequentially condition logical AND circuits 364, 363, 362 and 361 respectively. These logical AND circuits are also conditioned by the ON output of print control latch 370. Hence, data signals are passed by these logical AND circuits and then are passed by logical OR circuit 365 through the closed contact RTa to the logical OR circuit 356 which will pass the signals to the printer 400. The fifth strobe pulse from ring 201 is passed by logical OR circuit 105 to advance the address ring 100 and when the ring 100 switches from time position to channel 1 position, logical AND circuit 410 will be conditioned to pass a signal to tab terminal 402 and the printhead of the printer will tab to the next field. The fifth strobe signal will also be entered into delay 202 which will develop a signal for conditioning the connected logical AND circuits for controlling level and rate measurements after all switching transients have subsided.

With the address ring 100 switched to the channel one position, relay R1 is energized and therefore contacts R1a, R1b, R1c, R1d, R1e, R1f are closed. Hence, the signal from temperature transducer 21 is transmitted via conductor 41 to output terminal 42 and from there via channel conductor 51, closed contact R1a and conductor 110 to the DC amplifier 170. The output of the DC amplifier 170 supplies the unknown voltage to comparator 251.

A signal will be passed by logical AND circuit 185 indicating a level measurement is being made because there will not be any inputs on conductors 162 and 163 at this time. This signal will also be passed by logical AND circuit 225 because the previous fifth strobe was delayed by delay 202 and the delay 202 conditions AND circuit 225. The output from AND circuit 225 switches the oscillator start switch 255 to the on position and the oscillator 252 is thus turned on. The impulses generated by oscillator 252 are passed to counter 254. The count in counter 254 is applied to the switches and ladder network 253 of the analog to digital converter 250. The network 253 develops a voltage which is applied to comparator 251 and when the value set in counter 254 equals the unknown voltage, the comparator 251 generates a signal which switches the oscillator start latch 255 to the OFF condition. The analog to digital conversion is now complete.

With the oscillator start latch 255 switched to the OFF condition, the oscillator 200 is turned on via logical AND circuit 226 and logical OR circuit 199 and the strobe ring 201 advances through its positions. As the strobe ring advances through its positions, the strobe pulses will attempt to gate data via logical AND circuits 351, 352, 353 and 354 from counter 254. The data in counter 254 will be passed by these logical AND circuits at this time only if the print control latch 370 is on. Print control latch 370 will be on because it had been set on by operation of the printout key POK and has not as yet been reset by a signal from logical AND circuit 316 because the address ring has not been advanced through all its positions so as to reach the check position. Hence, the data in counter 254 will be passed serially by character via logical AND circuits 351, 352, 353, and 354 to logical OR circuit 355 and from logical OR circuit via relay contact R1e and logical OR circuit 356 to the printer 400. The fifth strobe pulse from ring 201 will advance ring 100 from channel position 1 to channel position 2.

The relay contacts R2a, R2b, R2c, R2d, R2e and R2f will be energized because the relay R2 becomes energized when the address ring 100 advances to channel 2 position. Under these conditions, the signal passed by respiration transducer 22 is transmitted by conductors 65, 120 and 161 to pulse amplifier 175. Logical AND circuit 184 will be passing a signal to indicate that a rate measurement is being made and thus logical AND circuit 230 will be conditioned to pass a signal from delay 202 to start the thirty second timer 231. The thirty second timer 231 will provide a signal to condition logical AND circuit 192 whereby the pulse developed by pulse amplifier 175 on its output terminal 178 will be transmitted into counter 254. The pulses from pulse amplifier 175 will be entered into the binary 2 conductor of the units position of counter 254 for thirty seconds. At the end of thirty seconds, a signal will be passed from thirty second timer 231 via logical OR circuit 199 to the ON terminal of oscillator 200. This will cause the strobe ring 201 to develop the strobe pulses for reading out the value in counter 254. Additionally, logical OR circuit 240 will receive a signal which samples the condition of the level alarm control latch 450. It will be recalled that if the level alarm control latch 450 is off at this time, then the level alarm 451 will be turned on. The data in counter 254 will be transmitted to printer 400 because the print control latch 370 is still in the on condition. The fifth strobe from ring 201 advances the address ring 100 to the channel three position.

With the address ring 100 in the channel three position, relay R3 will be energized and contacts R3a, R3b, R3c, R3d, R3e and R3f will be closed. Additionally, logical AND circuit 181 will pass a signal to indicate that a systolic blood pressure measurement is being made. The air pump 206 will be turned on by the delayed fifth strobe pulse and the fact that logical AND circuit 181 passes a signal and the up to pressure latch 196 is in the off condition.

When the air pressure in line 207 reaches the desired limit, switch 205 is activated and the up to pressure latch 196 is switched to the ON condition. This conditions logical AND circuit 193 because logical AND circuit 181 is also active at this time. Logical AND circuit 193 will pass a signal to initiate an analog to digital conversion when it receives a signal from two-second delay 195. The two second delay 195 will be turned ON when pulse amplifier 175 receives an impulse from transducer 23 via modifier 33 and input channel 3.

The pulse passed by pulse amplifier 175 is indicative of systolic blood pressure and it will be passed by the conditioned logical AND circuit 190 to switch on the two-second delay 195. Consequently, the signal will be passed by logical AND circuit 193 to switch on the oscillator start latch 255 via logical OR circuit 210.

With the oscillator start latch 255 in the ON state, an analog to digital conversion of the air pressure in line 207 as determined by strain gage 25 will be made. The unknown analog signal will be supplied via DC amplifier 170. The unknown analog voltage indicative of air pressure at this time will be passed via modifier 33 channel three and DC amplifier 170 to comparator 251. The value in counter 254 as developed by oscillator 252 will develop a voltage to the ladder network 253 to provide a comparison voltage to comparator 251. When the unknown voltage and the developed voltage applied to comparator 251 are equal, the oscillator start latch 255 is switched to the OFF state. The second pulse passed by pulse amplifier 175 turns on oscillator 200 via logical AND circuits 191 and 199 providing the delay 195 is still on. This causes the strobe ring 201 to develop strobe pulses for reading out the value in counter 254 which will be passed sequentially by high order digit first to printer 400 because the print control latch 370 is still in the ON condition at this time. The level alarm 451 of course, will not be switched on unless the level alarm control latch 450 were in the off state at the time the oscillator start latch 255 switched to its off state. The fifth strobe pulse of strobe ring 201 again shuts off the oscillator 200 and advances the address ring 100 from channel three to channel four.

Channel four, it will be recalled in this instance, contains modifier 34 which is wired for a diastolic blood pressure measurement. Hence, logical AND circuit 182 is conditioned at this time and it will provide a conditioning signal to logical AND circuits 215, 216 and 217. During the time that the diastolic blood pressure measurement is being made, pulses will be passed to the pulse amplifier 175 and from there to peak detector 220 which will develop output pulses provided the succeeding input pulses are increasing. These output pulses will be passed by logical AND circuit 215 to turn on delay 195.

An analog to digital conversion is made for each time the peak detector 220 passes an impulse because this signal will also be passed by logical AND circuit 217 to turn on the oscillator start latch 255. It will be recalled that the largest amplitude pulse passed by pulse amplifier 175 to peak detector 220 is indicative that diastolic blood pressure has been reached. Hence, when no more pulses are emitted from peak detector 220 the delay 195 times out and this initiates a turn on of oscillator 200 via logical AND circuit 216 and logical OR circuit 199. With the oscillator 200 turned on, the strobe ring 201 will develop the five strobe pulses. The first four of these strobe pulses will function to serially read out the value in counter 254 and this data will be gated to logical AND circuits 351, 352, 353 and 354, to logical OR circuit 355 and from there through relay contact R4e to the printer 400 through logical OR circuit 356. The switching off of the oscillator start latch 255 at the end of the analog to digital conversion for the diastolic blood pressure initiates a check of the level alarm control latch 450. The fifth pulse from strobe ring 201 advances the address ring 100 from channel four to channel five.

With the address ring 100 in the channel five position, relay R5 is energized and its associated contacts will be operated whereby data from pulse transducer 24 will be applied to channel five on the appropriate individual conductors as described above. In view of the fact that a pulse measurement is a rate measurement and a rate measurement has already been described, it is not considered necessary to describe this measurement in detail. Hence, during this measurement when the strobe ring 201 is advanced by oscillator 205 to its fifth position, the fifth strobe pulse advances the address ring 100 from channel five to the check position.

The check position of address ring 100 causes relay RC to be energized and it closes its associated contacts RCa and RCb. With the contact RCa closed, the check voltage supplied by block 165 is applied to the DC amplifier 170. Therefore, DC amplifier 170 delivers an analog voltage to comparator 251. Further, since relay contact RCb is closed at this time, logical AND circuit 166 which is conditioned by the output of delay 202 passes a signal to switch the oscillator start latch 255 to the ON condition. This of course turns ON oscillator 252 and counter 254 is advanced whereby a comparison voltage is developed by the switches and ladder network 253 which is applied to comparator 251. After completion of the analog to digital conversion, the value in counter 254 is compared against a value furnished by check standard 330. This comparison is accomplished by logical AND circuits 321, 322, 323 and 324. If each of these logical AND circuits pass a signal to logical AND circuit 320, then there is an indication that the analog to digital converter 250 is operating properly as well as the DC amplifier 170. The output from logical AND circuit 320 advances the address ring 100 via logical OR circuit 105 and also conditions logical AND circuit 405 so that when the address ring 100 advances to the time position, logical AND circuit 405 will pass a signal to the carriage return terminal 401 of printer 400 whereby the print element is returned to the most left side of the printer 400. The output of the logical AND circuit 320 also conditions logical AND circuit 316. Logical AND circuit 316 will pass a signal to switch the print control 370 to the OFF state if the interval timer switch 305 is switched to a terminal other than 306.

It should be recognized that the logic circuitry in FIG. 2 is schematically illustrated and that the actual apparatus implementing the logic circuitry provides the necessary timing conditions to satisfy the desired logic conditions. This can be accomplished by a person skilled in the art.

After the initial cycle of operation, the monitor will continue to address the input channels; however, data will be printed out by printer 400 only if the print control latch 370 is set. Print control latch 370 will have remained set after the initial cycle if the interval timer switch 305 is set to terminal 306. Otherwise, the print control latch 370 will be switched to its off state and will subsequently be set when the interval time applied from clock 300 to logical AND circuits 373, 374, 375, 376 and 377 matches the setting of the interval timer switch 305.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a physiological monitoring system:
a plurality of input channels, each input channel having data conductors for receiving rate, level and measurement identification signals, said channels being connected to data conversion and accumulating devices and scannable in a fixed sequence; and
a plurality of pluggable data input devices each having selective internal connections whereby each input device can be plugged into any of the input channels in any desired order and data is routed to the proper data conductors of the data input channels.

2. In a physiological monitor:
a recorder for recording data in digital form;
a series of level input channels selectively connectable to signal sources indicative of level conditions;
a series of rate input channels selectively connectable to signal sources indicative of rate conditions;
means for identifying the signal sources;
signal level to digital converting means connected to said level input channels under control of said identifying means;
rate signal accumulating means connected to said rate input channels under control of said identifying means;
a digital recorder connectable to said converting and accumulating means;
first control means operable to connect said level and rate input channels to said signal sources; and
second control means operable to connect said recorder to said converting and accumulating means.

3. The physiological monitor of claim 2 wherein said second control means is connected to sequence the operation of said first control means.

4. The physiological monitor of claim 2 wherein said second control means includes means for connecting said recorder to said converting and accumulating means only at predetermined time intervals.

5. In a physiological monitor:
a plurality of level inputs;
a plurality of rate inputs;
a plurality of data channels for receiving said rate and level inputs, each channel having rate, level and signal identifying conductors;
a plurality of pluggable signal modifiers connected to said level and rate inputs and sequentially connectable to said data channels, said signal modifiers including means for identifying the type of input signal; and
means for sequentially connecting said modifiers to said data channels.

6. The physiological monitor of claim 5 further comprising:
means for converting level inputs to digital form;
means for accumulating said rate inputs; and
means under control of said signal identifying conductors for connecting said converting and accumulating means to said data channels.

7. The physiological monitor of claim 6 further comprising:
skip means connected to modify said sequentially connecting means.

8. The physiological monitor of claim 7 further comprising:
digital data recording means connectable to said converting and accumulating means; and
means under control of said signal identifying conductors connecting said recording means to said converting and accumulating means.

9. In a physiological monitor:
a plurality of data channels, each for receiving rate, level and signal source identifying signals;
a plurality of pluggable signal modifiers each providing output signals according to the type of data input sources connected to said modifiers including data identifying signals;
means for connecting said modifiers to said input channels; and
combined signal converting and accumulating means connected to said data channels and rendered operable according to said identifying signals to perform converting and accumulating operations.

10. In a physiological monitor:
level, rate and signal identifying channels;
a plurality of rate inputs connectable to said rate and identifying channels;
a plurality of level inputs connectable to said level and identifying channels;
data converting means connected to said level channels and operably connected to said signal identifying channels;
data accumulating means connected to said rate channels and rendered operable under control of said signal identifying channels;
means connecting said plurality of rate and level inputs in a fixed sequence to corresponding rate and level channels and to said signal identifying channels;
a digital data recorder;
data gating means connected between said recorder and said converting and accumulating means; and
means for rendering said data gating means operable.

11. The physiological monitor of claim 10 wherein said connecting means is sequentially operated under control of said means for rendering said gating means operable.

12. The physiological monitor of claim 10 wherein said digital recorder is a serial printer.

13. The physiological monitor of claim 12 wherein said means for rendering said data gating means operable successively conditions said gating means whereby digital data is transferred a character at a time to said printer.

14. The physiological monitor of claim 10 further comprising:
skip means operable to control said connecting means whereby the same is caused to connect the next input in said fixed sequence to said channels upon said skip means being rendered operable.

15. The physiological monitor of claim 10 further comprising:
interval timer means for providing conditioning signals and connected to further control said gating means whereby data is transferred to said digital recorder at predetermined time intervals.

16. The physiological monitor of claim 10 further comprising:
means under control of said connecting means for providing a standard voltage to said converting means;
a check standard; and
means for comparing the converted standard voltage with said check standard to determine if said converting means is operating properly.

17. In a physiological monitor:
level, rate, and signal identifying channels;
a plurality of level inputs connectable to said level and signal identifying channels;
a plurality of rate inputs connectable to said rate and signal identifying channels;
data converting means connected to said level channels and operably connected to said signal identifying channels;
data accumulating means connected to said rate channels and operably connected under control of said signal identifying channels;

means connecting said plurality of rate and level inputs in a predetermined sequence to corresponding rate and level channels and to said signal identifying channels;

a digital data recorder;

data gating means connected between said recorder and said converting and accumulating means; and means for rendering said data gating means operable at predetermined time intervals.

18. The physiological monitor of claim 17 further comprising:

control means connected to said data converting means and to said rate channels to control the operation of said data converting means whereby a conversion is made of level data upon the occurrence of a first signal on said rate channels.

19. The physiological monitor of claim 18 wherein said control means renders said data converting means operable to convert level data upon the occurrence of a peak pulse on said rate channels.

20. In a physiological monitor:

a plurality of level inputs which upon being converted to digital form are represented in conventional physiological units;

a plurality of rate inputs which upon being accumulated over a predetermined period of time are representable in conventional physiological units;

a plurality of data channels for receiving said rate and level inputs, each channel having rate, level and signal identifying conductors;

data converting means connected to the level and signal identifying conductors of said channels for converting level inputs at predetermined times to digital data;

data accumulating means connected to the rate and signal identifying conductors of said channels and operable to accumulate data for predetermined period of time;

a plurality of pluggable signal modifiers each being connected to an input and being sequentially connectable to said input channels, said signal modifiers including means to provide a connection whereby if the associated input is a rate input it is connectable to the rate conductor of the channel and if it is a level input it is connectable to the level conductor of the channel, means to provide signals identifying the type of input; and means for sequentially connecting said modifiers to said data channels.

References Cited

UNITED STATES PATENTS

| | | |
|---|---|---|
| 2,701,748 | 2/1955 | Anderson. |
| 2,987,704 | 6/1961 | Gimpel et al. |
| 2,905,520 | 9/1959 | Anderson _____ 340—183 XR |
| 3,177,404 | 4/1965 | Patmore _____ 317—99 |
| 3,217,306 | 11/1965 | Hillman _____ 340—181 |

OTHER REFERENCES

National Bureau of Standards Report 3301, "Physiological Monitoring Equipment for Anaesthesia and Other Uses," S. R. Gilford; H. P. Broida, May 15, 1954.

JOHN W. CALDWELL, *Primary Examiner.*

THOMAS B. HABECKER, *Examiner.*

D. J. YUSKO, *Assistant Examiner.*